United States Patent
Kawazu et al.

(10) Patent No.: US 7,294,328 B2
(45) Date of Patent: *Nov. 13, 2007

(54) METHOD FOR PRODUCING α-ALUMINA FORMED BODY

(75) Inventors: Hidekatsu Kawazu, Niihama (JP); Osamu Yamanishi, Niihama (JP); Kazuya Tsuchimoto, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/055,651

(22) Filed: Feb. 11, 2005

(65) Prior Publication Data

US 2005/0169834 A1 Aug. 4, 2005

Related U.S. Application Data

(63) Continuation of application No. 10/154,915, filed on May 28, 2002, now abandoned.

(30) Foreign Application Priority Data

May 31, 2001 (JP) .............................. 2001-163610

(51) Int. Cl.
*C01F 7/00* (2006.01)
(52) U.S. Cl. ...................... 423/628; 502/415; 502/439
(58) Field of Classification Search ................ 423/628; 502/439, 415
See application file for complete search history.

(56) References Cited

U.S. PATENT DOCUMENTS

| 3,222,129 A | 12/1965 | Osment et al. |
| 3,392,125 A | 7/1968 | Kelly et al. |
| 3,628,914 A | 12/1971 | Graulier |
| 4,051,072 A | 9/1977 | Bedford et al. |
| 4,119,474 A | 10/1978 | Whitman et al. |
| 4,224,302 A | 9/1980 | Okamoto et al. |
| 4,242,235 A | 12/1980 | Cognion et al. |
| 4,444,899 A | 4/1984 | Yamada et al. |
| 4,579,839 A | 4/1986 | Pearson |
| 4,608,363 A | 8/1986 | Goodboy |
| 4,990,481 A | 2/1991 | Sato et al. |
| 5,100,857 A | 3/1992 | Sato et al. |
| 5,935,894 A | 8/1999 | Kanazirev |
| 6,962,684 B2 * | 11/2005 | Kawazu et al. ............. 423/628 |

FOREIGN PATENT DOCUMENTS

| GB | 1058988 A | 2/1967 |
| JP | 4-160078 A | 6/1992 |

OTHER PUBLICATIONS

Patent Abstracts of Japan, Japanese Publication No. 02-043952, published Feb. 14, 1990, to Fujimi Kenmazai Kobiyo KK.
Patent Abstracts of Japan, Japanese Publication No. 04-160078, published Jun. 3, 1992, to Kanebo Ltd.

* cited by examiner

*Primary Examiner*—Steven Bos
(74) *Attorney, Agent, or Firm*—Sughrue Mion Pllc.

(57) ABSTRACT

A high-strength α-alumina formed body with a low soda content, of which pore distribution is controlled, can be provided in an easy and inexpensive manner. The α-alumina formed body can be produced by a method comprising calcining a gibbsite-phase aluminum hydroxide to obtain rehydratable alumina powder; forming the rehydratable alumina powder in the presence of water to obtain a formed body; maintaining the formed body in the presence of water at about 110-200° C., to rehydrate the formed body; and calcining the rehydrated formed body at about 1200° C. or higher. The α-alumina formed body is useful as a carrier for catalysts, chemicals, microbes for food leftover disposal and the like.

3 Claims, 1 Drawing Sheet

METHOD FOR PRODUCING α-ALUMINA FORMED BODY

This is a continuation of application Ser. No. 10/154,915 filed May 28, 2002 now abandoned, the entire disclosure if which is incorporated herein by reference.

BACKGROUND OF THE INVENTION

1. Field of the Invention

The present invention relates to a method for producing a formed body of an α-alumina. More specifically, the present invention relates to a method for producing a high-strength formed body of an α-alumina with a controlled pore volume.

2. Related Art of the Invention

α-alumina formed bodies have been used as carriers for various materials such as chemicals. In these usages, various requests are made on the pore distribution and the pore volume of the carriers. For example, there is a case in that a large pore volume is required to carry a large amount of components therein, or a case in that pore distribution is needed to be controlled to have a predetermined one (see, Japanese Patent Application Laid-Open No. 54-89988, which corresponds to U.S. Pat. No. 4,242,235, or Japanese Patent Publication No. 6-16850, which corresponds to U.S. Pat. Nos. 4,990,481 and 5,100,857). Also, when an alumina formed body is used in a fixed bed facility as a catalyst carrier or an adsorbent, high strength is required to be durable against the collapse thereof during the taking out and filling in of the catalyst. In order to fulfill these requirements, an α-alumina formed body having a large pore volume with high strength has been needed.

Also, in some usages of carrying a catalyst, it is preferred that an alumina formed body has a smaller content of $Na_2O$ (hereinafter, referred to as "soda") in order to reduce segregation of carried metals and the deterioration of the carried components.

Heretofore, as described in Japanese Patent Application Laid-Open No. 52-105587 (which corresponds to U.S. Pat. No. 4,224,302), α-alumina carriers for catalyst are typically produced in one of the following methods (1)-(3).

Method (1): An aluminum hydroxide as a starting material is calcined at a temperature of from 500° C. to 700° C. to obtain an activated alumina powder. The activated alumina powder is mixed with a binder or the like and is then granulated. The resultant grains are calcined and are sintered at a high temperature of from 1400° C. to 1600° C., to obtain an α-alumina carrier with high strength.

Method (2): The starting material as in (1) is calcined at a high temperature of from 1200° C. to 1300° C. to obtain α-alumina powder. The α-alumina powder is mixed with a binder or the like and is then granulated. The resultant grains are calcined and are sintered at a high temperature of from 1400° C. to 1600° C., to obtain an α-alumina carrier with high strength.

Method (3): A gibbsite-phase aluminum hydroxide powder is mixed with a binder or the like and is then granulated. The resultant grains are subjected to hydrothermal treatment to obtain a boehmite. The boehmite is calcined and is then sintered at a high temperature of 1200° C., to obtain an α-alumina carrier with high strength.

In methods (1) and (2), the strength of the obtained α-alumina carriers is insufficient. In method (3), it is difficult to control the pore volume and pore distribution of the α-alumina carrier.

For obtaining an alumina having a reduced soda content, the following methods are known.

Method (4): An aluminum hydroxide with a low soda content, which may be obtained by hydrolysis of aluminum alkoxide, is used as a starting material to obtain an alumina carrier.

Method (5): An alumina formed body with a high soda content is washed with an acid or water, to obtain an alumina carrier.

In methods (4) and (5), an alumina carrier (or formed body) with a low soda content is obtained. However, method (4) has problems such that the production method is complicate and costs high. Method (5) has problems such that the alumina itself is eluted by the acid treatment, causing reduction in strength and that the method requires a cost for wasted water treatment and thus is not necessarily economical.

For controlling pore distribution of an alumina, a method including addition of an organic substance is generally known (see, Japanese Patent Application Laid-Open No. 4-160078). However, this method has problems such that the cost is high because an organic substance is necessary and that the strength of the obtained alumina tends to significantly decrease with increase of the pore volume.

SUMMARY OF THE INVENTION

Therefore, an object of the present invention is to provide a high-strength α-alumina formed body (with a low soda content, if needed) of which pore distribution can be controlled, in an easy and inexpensive manner, as well as to provide a carrier comprising the α-alumina formed body.

The inventors of the present invention have made vigorous examination to solve the above-mentioned problems. As a result, the present inventors have found that a high-strength α-alumina formed body with a controllable pore distribution, which is usable as a carrier for materials such as catalysts, can be obtained in a very simple process comprising the steps of rehydrating a formed body of at least partially rehydratable alumina powder and calcining the formed body. Based on the above findings, the present invention has been completed.

The present inventors have further found that an α-alumina formed body with a low soda content, which is useful as carrier, can be obtained by washing a rehydrated α-alumina formed body with water before calcination under commonly applied conditions.

The present invention provides a method for producing an α-alumina formed body, the method comprising the steps of:

(i) calcining a gibbsite-phase aluminum hydroxide controlled in median particle size and in packed bulk density to obtain at least partially rehydratable alumina powder;

(ii) forming the at least partially rehydratable alumina powder in the presence of water to obtain a formed body;

(iii) maintaining the formed body in the presence of water at a temperature of form about 110° C. to about 200° C., to rehydrate the formed body; and (iv) calcining the rehydrated formed body at a temperature of about 1200° C. or higher.

DESCRIPTION OF THE PRESENT INVENTION

Figure 1:
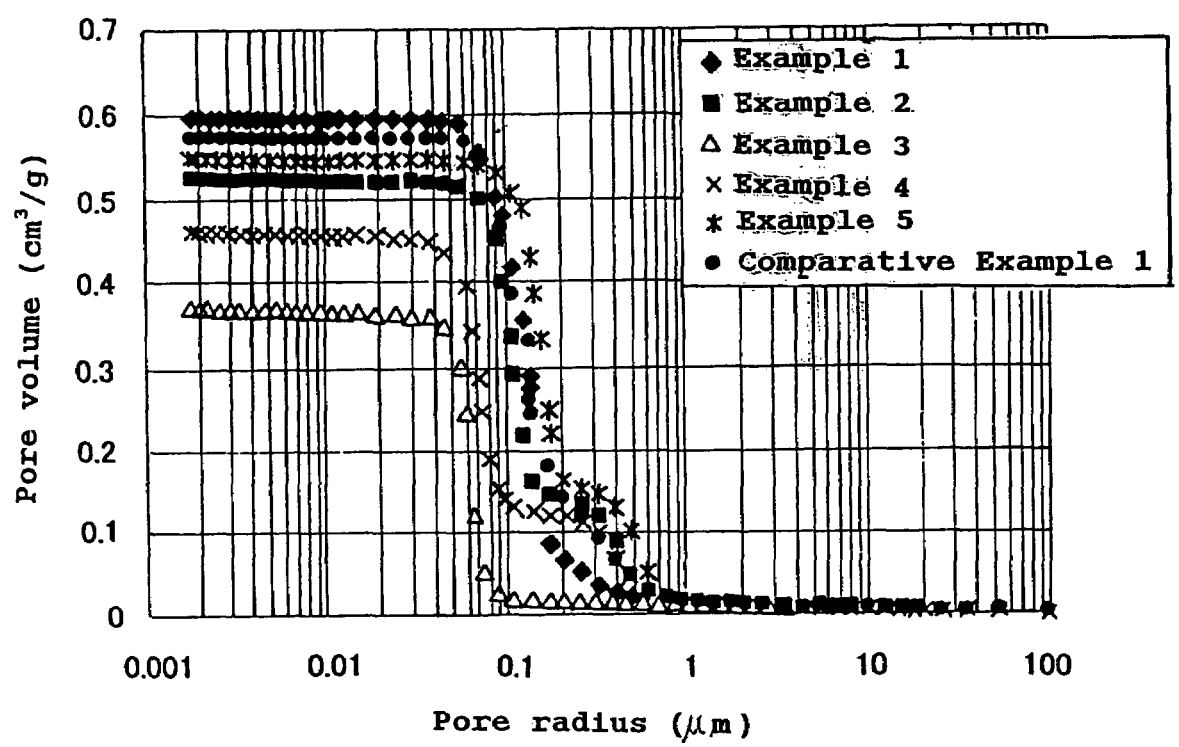
FIG. 1 shows pore distributions of example α-alumina formed bodies of the present invention and that of a comparative example (see, Examples 1-5 and Comparative Example 1).

In the present invention, a gibbsite-phase aluminum hydroxide may be used to produce an α-alumina formed body. The gibbsite-phase aluminum hydroxide may be aluminum trihydroxide ($Al(OH)_3$) obtainable industrially by the Bayer process. The purity of the gibbsite-phase aluminum hydroxide is not limited. The $Na_2O$ content in the gibbsite-phase aluminum hydroxide may be in the range of from about 0.2% to about 1%.

The gibbsite-phase aluminum hydroxide preferably has a controlled median particle size and a controlled packed bulk density. The median particle size of the gibbsite-phase aluminum hydroxide may be controlled to be about 15 μm or smaller. The median particle size of the gibbsite-phase aluminum hydroxide is preferably controlled to be in the range of from about 5 μm to about 15 μm, more preferably in the range of from about 6 μm to about 14 μm, and most preferably in the range of from about 8 μm to about 12 μm. As the median particle size is larger, macro pores tend to be generated in the resultant α-alumina. When the median particle size is about 10 μm or larger, macro pores having a radius of about 0.3 μm or larger may be formed in the resultant α-alumina.

The packed bulk density of the gibbsite-phase aluminum hydroxide may be controlled to be about 0.8 $g/cm^3$ or larger. The packed bulk density of the gibbsite-phase aluminum hydroxide is preferably controlled to be in the range of from about 0.8 $g/cm^3$ to about 1.8 $g/cm^3$, more preferably in the range of from about 0.9 $g/cm^3$ to about 1.4 $g/cm^3$, most preferably in the range of from about 0.9 $g/cm^3$ to about 1.2 $g/cm^3$. As the packed bulk density of the gibbsite-phase aluminum hydroxide is smaller, the total pore volume of the resultant α-alumina tends to be larger. When the packed bulk density is about 1.05 $g/cm^3$ or smaller, the total pore volume of the resultant α-alumina may be about 0.50 $cm^3/g$ or larger. In the present invention, the value of the packed bulk density of the gibbsite-phase aluminum hydroxide can be measured in the state in which the aluminum hydroxide has the content of water attached thereto of about 1% or less.

In the present invention, the gibbsite-phase aluminum hydroxide is calcined to obtain at least partially rehydratable alumina powder. The calcination is preferably carried out instantaneously under the conditions to be described later. The rehydratable alumina refers to one of alumina, such as χ-alumina, ρ-alumina and amorphous alumina, which is capable of being rehydrated among transition alumina obtained by thermal decomposition of aluminum hydroxide. (The term "transition alumina" here includes all types of alumina having polymorphism represented by $Al_2O_3$, other than α-alumina.)

The preferable instantaneous calcination is performed by allowing the gibbsite-phase aluminum hydroxide to flow in an airflow of a linear velocity of from about 5 m/sec to about 50 m/sec at a temperature of from about 500° C. to about 1200° C. for a contact time period of about 0.1 to about 10 seconds. The calcination is preferably continued until the ignition loss becomes from about 3% by weight to about 10% by weight.

The alumina powder obtained by the calcinations in the airflow can be separated from the airflow and can be collected by a known method using a cyclone, a bug filter, an electric collector or the like. The powder may be cooled simultaneously with or after the separation and collection, to obtain the at least partially rehydratable alumina powder.

The thus-obtained at least partially rehydratable alumina powder may have an ignition loss of from about 3% by weight to about 10% by weight and may have a BET specific surface area of about 100 $m^2/g$ or more. The alumina powder may contain χ-alumina and/or ρ-alumina as its main component as to crystal phase.

In the present invention, the at least partially rehydratable alumina powder may be formed in the presence of water to obtain a formed body thereof. The forming may be conducted by a method in which the rehydratable alumina powder is fed to Marumerizer or a tumbling granulator together with water and is granulated. Alternatively, the forming may be conducted by a method in which the rehydratable alumina powder is moistened with water and then is compacted with a die; a method in which the rehydratable alumina powder is mixed with water and then is formed with an extruder; a method in which the rehydratable alumina powder is mixed with water and then is stirred in a solvent that is non-miscible with water. The forming of the rehydratable alumina powder without using water (for example, a wet forming method of using only a liquid such as an organic solvent) is not preferred. However, in the forming, a small amount of water-miscible organic solvent can be present with water. If a spherical product is desired, the tumbling granulation method is most suitable because this method provides high productivity.

The amount of water to be present with the rehydratable alumina powder in the forming is not limited, and may be about 40 parts by weight to about 60 parts by weight based on 100 parts by weight of the rehydratable alumina powder.

The resultant formed body of the rehydratable alumina may have various shapes such as a spherical shape, a cylindrical shape, a ring shape, a plate shape, a honeycomb shape and a block shape.

When the rehydratable alumina is formed in the presence of water, another inorganic compound may be added to the rehydratable alumina as long as the pore structure and strength of the final product, i.e., an α-alumina formed body will not be impaired. Examples of such an inorganic compound include non-rehydratable alumina such as α-alumina, aluminum salt, silica, clay, talc, bentonite, zeolite, cordierite, titania, alkali metal salt, alkali-earth metal salt, rare earth metal salt, zirconia, mullite and silica alumina. If a salt other than an oxide is added, it is preferred that the salt is decomposed during the calcination conducted later, to become an oxide of the salt.

The thus-obtained formed body of the at least partially rehydratable alumina may be maintained in the presence of water (for example, in a water vapor atmosphere, in a gas containing water vapor or the like) at a temperature of form about 110° C. to about 200° C., and preferably at a temperature of form about 130° C. to about 180° C., to rehydrate the formed body. By this rehydration, the mechanical strength of the final product, i.e., an α-alumina formed body, can be enhanced. For the rehydration, it is preferred that the formed body is maintained in a humidity such that water can be adsorbed into the micro-pores of the formed body. The humidity may be about 20% RH or more.

The rehydration of the formed body of the at least partially rehydratable alumina may be performed for about 10 minutes to one week, preferably for about one hour to about ten hours. It is preferred that, during the rehydration, the rehydratable alumina is substantially completely rehydrated to become boehmite-crystal aluminum hydroxide. The longer the rehydration time period is and/or the higher the rehydration temperature is, the higher mechanical strength of the resultant α-alumina formed body has. On the other hand, the rehydration at a temperature higher than about 200° C. is not economical because an expensive pressure-resistant facility is needed.

The rehydration of the formed body of the rehydratable alumina at a temperature of lower than about 110° C. is not desirable. This is because the mechanical strength of the final product, an α-alumina formed body, tends to become low; and an α-alumina formed body with a low soda content is difficult to be obtained even when soda removal treatment (mentioned below) is conducted.

In the present invention, the rehydrated alumina formed body may be subjected to a soda removal treatment, to finally obtain an α-alumina formed body with a low soda content. By conducting the soda removal treatment, the final product (an α-alumina formed body) in the present invention may have a low soda content such as about 0.2% or lower, which is desirable when the product is used as a carrier for a catalyst.

The soda removal treatment may be conducted by a method in which a rehydrated alumina formed body is washed with water at a temperature of about 100° C. or lower, and preferably at a temperature of from about 20° C. to about 90° C. The higher soda removal treatment temperature is, the faster the soda removal rate becomes.

The amount of the water to be used in the soda removal treatment is preferably in the range of from about the same to about 25 times by volume as large as the volume of the formed body to be treated. When the amount of water to be used in the soda removal treatment is smaller than this range, the soda removal effect may be insufficient. Even when the amount of water exceeds about 25 times by volume as large as the volume of the formed body, the soda removal effect may be no more enhanced in proportion to the volume of the water and thus is not economical. The method of the soda removal treatment is not limited, and may be a batch method or a column flow method.

In the soda removal treatment, an acid solution and/or a solution of an electrolyte may be added to water for the treatment as long as the mechanical strength of the resultant formed body will not be reduced. Examples of the acid to be used include a mineral acid such as hydrochloric acid and nitric acid and an organic acid such as acetic acid. Examples of the electrolyte to be used include a salt such as ammonium nitride, ammonium sulfate, ammonium chloride and ammonium acetate.

After the rehydration (and the soda removal treatment, if needed), the alumina rehydrated formed body may be calcined at a temperature of about 1200° C. or higher. By this calcination, the water attached to the formed body and crystallization water may be removed, so that the formed body may change to be an α-alumina formed body. The calcination temperature may be determined depending on the desired degree of changing to α-alumina or the desired specific surface of the formed body or the like. The calcination temperature may be about 1200° C. or higher, and preferably in the range of from about 1300° C. to about 1400° C. The calcination may be performed by various heating methods such as indirect heating with a burning gas or an electric heater and infrared heating. The calcination atmosphere is not limited, and the calcination may be performed in the air or in an atmosphere of nitrogen or hydrogen. Before the calcination, the water attached to the formed body is preferably removed by air drying, hot-blast drying, vacuum drying or the like.

In the present invention, a precursor of a catalyst component such as precious metal may be added to the formed body after the forming step or the rehydration step as long as the strength and the pore structure of the final product will not be impaired.

An α-alumina formed body obtained in the present invention may has a BET specific surface area of from about 0.1 $m^2/g$ to about 10 $m^2/g$, a pore volume of about 0.35 $cm^3/g$ or larger, a crashing strength of 100 $daN/cm^2$ or larger, and a wear ratio of about 2% or less.

An α-alumina formed body thus obtained in the present invention is usable as a carrier for various materials such as catalysts, chemicals and microbes for food leftover disposal. Also, an α-alumina formed body in the present invention is usable as a catalyst (for example, a reformed catalyst for preparation of hydrogen, or a catalyst for preparation of ethylene oxide) supporting precious metals and the like. In addition, the α-alumina formed body may be used as a filler as it is.

In accordance with the present invention, a high-strength α-alumina formed body with a low soda content, of which pore distribution can be controlled, is provided in an easy and inexpensive manner. A carrier comprising the α-alumina formed body is useful especially when the formed body is utilized as a carrier for catalysts, chemicals, microbes for food leftover disposal and the like.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2001-163610 filed on May 31, 2001 indicating specification, claims, drawings and summary, is incorporated herein by reference in their entirety.

EXAMPLES

The present invention is described in more detail by following Examples, which should not be construed as a limitation upon the scope of the present invention.

The physical properties in Examples were measured in the following manner.

Median Particle Size:

A median particle size of a sample was measured with a Microtrac particle size analyzer manufactured by Leeds & Northrup Packed Bulk Density:

A packed bulk density of a sample was measured with a powder tester manufactured by Hosokawa Powder Technology Foundation.

Crystal Phase:

A crystal phase of a sample was measured with a powder X-ray diffractometer manufactured by Rigaku Corporation.

BET Specific Surface Area:

A BET specific surface area of a sample was measured with a specific surface are measuring apparatus manufactured by Mountech Co., Ltd.

Crashing Strength:

A diameter and disruptive strength of a sample grain were measured with a micrometer and a hardness tester, respectively. Based on the diameter and disruptive strength, disruptive strength per cross-section of the sample was calculated. Using 10 samples, an average disruptive strength per cross-section of the samples was obtained, and was utilized as crashing strength of the samples.

Pore Volume and Pore Distribution:

Pore volume and pore distribution of a sample were measured respectively in a Hg injection method using Autoscan 33 porisimeter manufactured by Quantachrome Corporation.

Soda (Na₂O) Concentration:

After dissolving a sample in boric acid, soda concentration of the sample was measured with a flame photometer in accordance with JIS-H1901.

Example 1

A dried gibbsite-phase aluminum hydroxide (water content: 1% or less) having a median particle size of 8 μm and a packed bulk density of 0.92 g/cm³, which had been obtained by the Bayer process, was put in a hot gas flow of about 700° C. and was instantaneously calcined, to obtain an alumina powder. The obtained alumina powder was a rehydratable alumina powder having χ,ρ phase and an ignition loss of 7%.

Using a dish-shaped granulator having a diameter of 1 m, the rehydratable alumina powder was formed into spherical grains having a diameter of 2 mm to 4 mm, while spraying about 60 parts of water based on 100 parts of the powder. About 1 kg of the obtained grains was put in a glass beaker, which was then placed in a 5-liter autoclave made of stainless steel. While adding water into the autoclave and raising the temperature therein to 130° C., the grains were maintained in the saturated water vapor atmosphere for four hours, to rehydrate the grains and allow the grains to be aged.

About 200 g of the aged product was put in an alumina crucible, which was then placed in an electric oven. The temperature in the oven was raised at a rate of 300° C./hour to 1300° C. and was maintained at 1300° C. for two hours, to calcine the product. The crystal phase of the thus-obtained calcined product was examined. As a result, the product was an α-alumina. The physical properties of the product, i.e., α-alumina formed body, are shown in Table 1, and the pore distribution thereof is shown in FIG. 1.

Example 2

An α-alumina formed body was obtained in the same manner as that described in Example 1, except that the rehydration temperature was changed from 130° C. to 150° C. The physical properties of the resultant α-alumina formed body are shown in Table 1, and the pore distribution thereof is shown in FIG. 1.

Example 3

An α-alumina formed body was obtained in the same manner as that described in Example 1 using a dried gibbsite-phase aluminum hydroxide (water content: 1% or less) having a median particle size of 12 μm and a packed bulk density of 1.8 g/cm³, which had been obtained by the Bayer process. The physical properties of the resultant α-alumina formed body are shown in Table 1, and the pore distribution thereof is shown in FIG. 1.

Example 4

An α-alumina formed body was obtained in the same manner as that described in Example 1 using a dried gibbsite-phase aluminum hydroxide (water content: 1% or less) having a median particle size of 12 μm and a packed bulk density of 1.12 g/cm³, which had been obtained by the Bayer process. The physical properties of the resultant α-alumina formed body are shown in Table 1, and the pore distribution thereof is shown in FIG. 1.

Example 5

An α-alumina formed body was obtained in the same manner as that described in Example 1 using a dried gibbsite-phase aluminum hydroxide (water content: 1% or less) having a median particle size of 8 μm and a packed bulk density of 1.05 g/cm³, which had been obtained in the Bayer process. The physical properties of the resultant α-alumina formed body are shown in Table 1, and the pore distribution thereof is shown in FIG. 1.

Comparative Example 1

An α-alumina formed body was obtained in the same manner as that described in Example 1, except that the rehydration temperature was changed from 130° C. to 90° C. The physical properties of the resultant α-alumina formed body are shown in Table 1, and the pore distribution thereof is shown in FIG. 1.

TABLE 1

| | BET surface area (m²/g) | Crystal phase | Crashing strength (daN/cm²) | Pore volume (cm³/g) | Na₂O content (%) |
|---|---|---|---|---|---|
| Example 1 | 6.4 | α | 110 | 0.60 | 0.27 |
| Example 2 | 5.3 | α | 280 | 0.53 | 0.27 |
| Example 3 | 7.1 | α | 206 | 0.39 | 0.26 |
| Example 4 | 6.3 | α | 242 | 0.47 | 0.18 |
| Example 5 | 4.5 | α | 248 | 0.55 | 0.05 |
| Comparative Example 1 | 7.6 | α | 42 | 0.58 | 0.27 |

As is found from FIG. 1 and Table 1, the present invention provides an α-alumina formed body having a significantly high crashing strength and a wee-controlled pore distribution. In addition, as found from the results of Example 1, the present invention can provide an α-alumina formed body with a low soda content.

What is claimed is:

1. A method for producing an α-alumina formed body, the method comprising the steps of:
   (i) calcining a gibbsite-phase aluminum hydroxide having a median particle size of 15 μm or smaller and a packed bulk density of from 0.8 g/cm³ to 1.4 g/cm³ to obtain at least partially rehydratable alumina powder;
   (ii) forming the at least partially rehydratable alumina powder in the presence of water to obtain a formed body;
   (iii) maintaining the formed body in the presence of water at a temperature of from 110° C. to 200° C., to rehydrate the formed body; and
   (iv) calcining the rehydrated formed body at a temperature of about 1200° C. or higher.

2. A method for producing an α-alumina formed body according to claim 1, which further comprises a step of washing the rehydrated formed body with water at a temperature of 100° C. or lower before the calcining thereof.

3. A method according to claim 1, wherein the gibbsite-phase aluminum hydroxide has a packed bulk density of from 0.9 g/cm³ to 1.2 g/cm³.

* * * * *